A. H. ARMSTRONG.
MOTOR CONTROL SYSTEM.
APPLICATION FILED JULY 21, 1906.
919,302.
Patented Apr. 27, 1909.
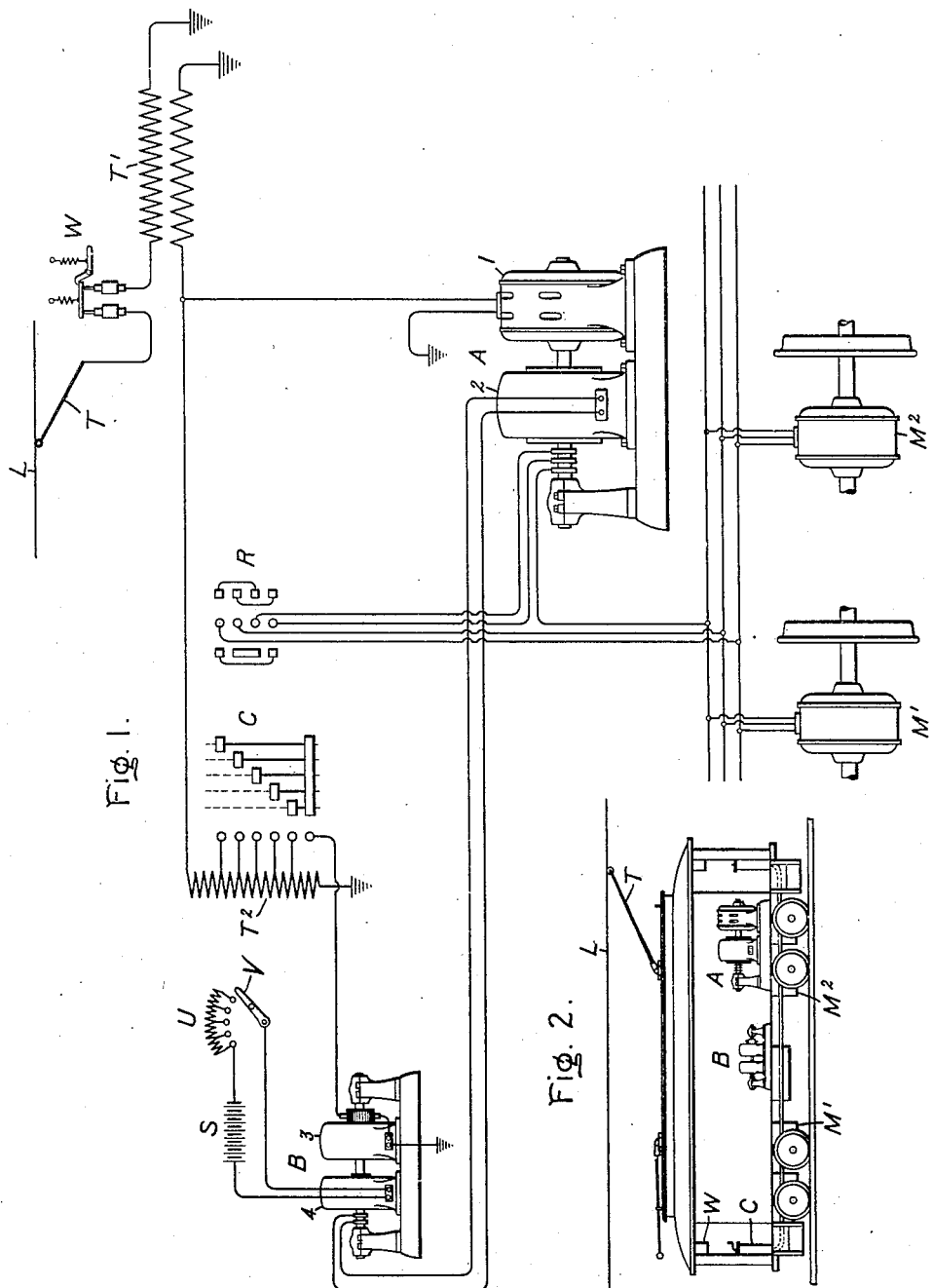
Witnesses:
George W. Tilden.
Inventor.
Albert H. Armstrong.
by Albert G. Davis
Att'y.

UNITED STATES PATENT OFFICE.

ALBERT H. ARMSTRONG, OF SCHENECTADY, NEW YORK, ASSIGNOR TO GENERAL ELECTRIC COMPANY, A CORPORATION OF NEW YORK.

MOTOR-CONTROL SYSTEM.

No. 919,302.   Specification of Letters Patent.   Patented April 27, 1909.

Application filed July 21, 1906. Serial No. 327,167.

*To all whom it may concern:*

Be it known that I, ALBERT H. ARMSTRONG, a citizen of the United States, residing at Schenectady, county of Schenectady, State of New York, have invented certain new and useful Improvements in Motor-Control Systems, of which the following is a specification.

The present invention has for its object to improve the control of electric motors, and particularly motors which are adapted to return energy to the line when driven by the load.

In electric railway systems, for example, it is necessary to provide means for operating motors at various speeds, and it is also advantageous to be able to cause the motors to operate as braking generators, and as such to return energy to the line in going down grade or upon slowing down the train. In alternating current systems, induction motors can be used to advantage as the propelling motors for the car or locomotive, but since these motors must run at a definite speed determined by the frequency of the supply current, they do not lend themselves to the desired adjustment of speed; nor will they operate as braking generators unless the car or locomotive is traveling at such a high speed as to drive them above synchronism.

By my invention, means are provided whereby motors of the character described, and other motors which run at synchronous speeds, may be controlled so as to give variation of speed within any desired limits and may be made to return energy to the line irrespective of the speed at which the car or locomotive is traveling. To this end, I insert between the source of supply and the propelling motors a motor-generator set, the generator supplying current to the propelling motor; and provide means for varying the frequency of the current supplied by the generator within such limits as may be desired under any given condition of service. In this system, therefore, the motor-generator runs at a substantially constant speed, which is slightly below synchronism when the propelling motors are driving the car or locomotive, and, since the speed of the propelling motors is determined by the frequency of the current derived from the motor-generator, a variation in that frequency produces a like variation in the speed of the propelling motors. When it is desired to return energy to the line, the frequency of the generated current is made such that the speed of the propelling motors corresponding thereto is less than the speed at which they are driven by the car or locomotive, whereupon the propelling motors, being driven above synchronism by the load, act as generators and supply energy to the generator of the motor-generator set. This generator now acts as a motor and drives the motor of the motor-generator at a speed slightly above synchronism, causing it to return energy to the source. The frequency of the generator is varied without making any change in the generator itself, preferably by exciting its field with current from a small variable speed motor-generator set, this exciting current having a frequency depending on the speed of the set.

My invention will be more fully understood and its objects and advantages will be more clearly apparent from the following detailed description, while its scope will be seen from the appended claims.

In the accompanying drawing, Figure 1 indicates diagrammatically a single car or locomotive equipment arranged in accordance with the present invention; and Fig. 2 shows a car having installed thereon the apparatus indicated in Fig. 1.

Reference being had to the drawing, $M^1$ and $M^2$ are two propelling motors, indicated as multi-phase induction motors, but which may be single-phase induction motors or the other motors having synchronous speeds.

L is a source of current supply indicated as a trolley-wire or third rail and a ground return.

A is a motor-generator, the motor 1 of which in connected to the source of supply by means of a current collector T. This connection may be a direct one, but if the line potential is high, a step-down transformer $T^1$ may be introduced. The transmission is shown as being single-phase, the motor 1 being therefore also of a single-phase type, but it will of course be understood that multi-phase transmission lines and multi-phase motors for the motor-generators may be employed. The armature of generator 2 is connected to the motors $M^1$ and $M^2$. A reversing switch R may be arranged in the connection between the generator armature and motors M¹ and M², in order that the direction of rotation of the motors and, therefore, the direction of travel of the car or train, may be changed.

B is a small variable-speed motor-generator for exciting the field of the main generator. Motor 3 of the auxiliary set may conveniently be of the series commutating type receiving current through a compensator or transformer T².

C is a controller for connecting the terminals of the motor 3 across variable portions of the transformer or compensator, the speed of this motor, of course, varying with the impressed voltage, since the load is substantially constant. The field of the auxiliary generator is excited from a source of direct current, as for example, storage battery S. A rheostat U is placed in the field circuit of the auxiliary generator with a switch V which may be used to open the field circuit, and also to alter the amount of resistance in this circuit.

In starting, or when it is desired to run the car or train at its lowest speed, the main switch W is closed, the reversing switch is moved to the proper running position, and the controller C is brought to the first running position, switch V being left open; both motor-generator sets now begin to operate, the main set A at its fixed speed determined by the constant frequency of the source, and the auxiliary set at its lowest speed. Controller C is then moved through its various running positions until the auxiliary set is running at its highest speed. Switch V in the field circuit of the auxiliary generator 4 is then closed. Since the auxiliary generator is running at its highest speed, the frequency of the current emanating therefrom is also high, and therefore the field of the main generator is energized by current having a high frequency. When the frequency of the exciting current for the main generator is at its highest value, the frequency of the current supplied by its generator to the propelling motors, is at the lowest value, and, since this latter frequency determines the speed of the motors M¹ and M², these motors propel the car or locomotive at a slow speed. By moving the main controller back into its different running positions, the speed of the motor 3 is reduced and the frequency of the current supplied by the auxiliary generator is decreased. Therefore, it follows that the frequency of the current supplied by the main generator to the propelling motors, and consequently the speed at which motors M¹ and M² must run, is also increased. It will be seen that by providing a large number of running points on the controller C, wide variations in the speed of the motors may be obtained, while, by means of the rheostat U the volume of the current generated by the auxiliary generator, and therefore the out-put of the main generator and the power of motors M¹ and M² may be controlled.

Since the synchronous speed of motors M¹ and M² may be varied within wide limits, and since these motors will operate as braking generators when driven by the load at a speed slightly above synchronous speed, a very simple and convenient regenerative system is provided, for it is only necessary, in order to make the motors act as braking generators, to so adjust the controller C as to make the frequency of the main generators such that the motors are left running at a speed slightly above synchronous. Under these conditions the motors operate as generators driven by the load and supply current to the main generator which now acts as a motor and drives the motor 1 above synchronism, causing it to return energy to the line. Then as the speed of the car or locomotive decreases, the controller is adjusted so as to keep the synchronous speed of the motors below actual speed. Thus, as long as the car or train is traveling at a rate corresponding to any speed of the motor above the lowest speed obtainable, it is possible to produce an electrical braking action.

Although I have described in detail a preferred form of my invention and the best instrumentalities known to me for carrying it out, I do not desire to be limited to the particular form shown or the instrumentalities employed, since in its broader aspects, my invention covers other forms and instrumentalities in addition to those shown and described.

What I claim as new, and desire to secure by Letters Patent of the United States, is,—

1. The method of operating an induction motor as a braking generator driven by the load and returning energy to a source of current of constant frequency, which consists in interposing between the motor and the source a motor-generator the motor field of which is excited by an alternating current, and then varying the frequency of said exciting current in accordance with variations in the speed of the braking generator.

2. In combination, a source of current, a motor whose speed is governed by the frequency of the current supplied thereto, a motor-generator including a motor connected to said source and an alternating current generator having its armature connected electrically to the first-named motor, and means for varying the frequency of the exciting current for the field of said generator.

3. In combination, a source of current, a motor whose speed is governed by the frequency of the current supplied thereto, a motor-generator including a motor connected to said source and a separately excited generator whose armature is electrically connected to said first-named motor, and means for varying the frequency of the exciting current for said generator.

4. In combination, a source of current, a motor whose speed is governed by the frequency of the current supplied thereto, a motor-generator including a constant-speed motor connected to said source and an alternating current generator having its armature connected electrically to the first-named motor and having a separately excited field, and means for varying the frequency of the exciting current for said field.

5. In combination, a source of alternating current, a motor whose speed is governed by the frequency of the current supplied thereto, a motor-generator including a constant-speed motor connected to said source and an alternating current generator having its armature connected to said first-named motor, and means for varying the frequency of the exciting current for said generator.

6. In combination, a source of alternating current having a fixed frequency, a motor whose speed is governed by the frequency of the current supplied thereto, a motor-generator including a constant-speed motor connected to said source and a separately excited alternating current generator having its armature connected to the first-named motor, and means for varying the frequency of the exciting current for said generator.

7. In an electric railway, an alternating current distribution system, a vehicle having a propelling motor whose speed is governed by the frequency of the current supplied thereto, a motor-generator on said vehicle including a constant-speed motor connected to said distribution system and an alternating current generator having its armature connected to the first-named motor, and means for varying the frequency of the exciting current for said generator.

8. In combination, a source of alternating current having a constant frequency, a motor or motors whose speed is governed by the frequency of the current supplied thereto, a motor-generator including a motor connected to the source and an alternating current generator having its armature connected to said motor or motors, an alternating current generator for exciting the field of the other generator, and means for varying the frequency of the current supplied by the exciting generator.

9. In combination, a source of alternating current having a constant frequency, a motor or motors whose speed is governed by the frequency of the current supplied thereto, a motor-generator including a motor connected to said source and an alternating current generator connected to said motor or motors, an auxiliary generator for exciting the main generator, and a variable speed motor for driving said auxiliary generator at various speeds to cause the excitation of the main generator to be effected by current of variable frequency.

10. In combination, a source of alternating current having a constant frequency, a motor whose speed is governed by the frequency of the current supplied thereto, a motor-generator including a motor connected to said source and an alternating current generator connected to said motor or motors, an auxiliary motor-generator including a variable speed motor, and a generator for exciting the main generator with current varying in frequency, and a controller for varying the speed of the motor of the auxiliary motor-generator to cause variation in the frequency of the exciting current delivered by said auxiliary generator.

11. In combination, a source of current, a motor whose speed is governed by the frequency of the current supplied thereto, a motor-generator including a motor connected to said source and an alternating current generator having its armature connected electrically to the first-named motor, and means for varying the frequency and the strength of the exciting current for the field of said generator.

12. In combination, a source of current, a motor whose speed is governed by the frequency of the current supplied thereto, a motor-generator including a constant-speed motor connected to said source and an alternating current generator having its armature connected electrically to the first-named motor and having a separately excited field, and means for varying the frequency and the strength of the exciting current for said field.

13. In combination, a source of alternating current having a fixed frequency, a motor whose speed is governed by the frequency of the current supplied thereto, a motor-generator including a constant-speed motor connected to said source and a separately excited alternating current generator having its armature connected to the first-named motor, and means for varying the frequency and the strength of the exciting current.

14. In combination, a source of alternating current having a constant frequency, a motor or motors whose speed is governed by the frequency of the current supplied thereto, a motor-generator including a motor connected to the source and an alternating current generator having its armature connected to said motor or motors, an alternating current generator for exciting the field of the other generator, and means for varying the frequency and the strength of the current supplied by the exciting generator.

15. In combination, a source of alternating current having a constant frequency, a motor or motors whose speed is governed by the frequency of the current supplied thereto, a motor-generator including a motor connected to said source and an alternating current generator connected to said motor or motors, an auxiliary motor-generator including a variable speed motor and a generator for exciting the main generator with current varying in frequency, a controller for varying the speed of the motor of the auxiliary motor-generator to cause variation in the frequency of the exciting current delivered by said auxiliary generator, and means for varying the strength of the current generated by the auxiliary generator.

16. In combination, a source of alternating current having a constant frequency, a motor or motors whose speed is governed by the frequency of the current supplied thereto, a motor-generator including a motor connected to said source and an alternating current-generator connected to said motor or motors, an auxiliary generator for exciting the main generator, means for varying the field strength of said auxiliary generator, and a variable speed motor for driving said auxiliary generator at various speeds to cause the excitation of the main generator to be effected by the current of variable frequency.

17. In combination, a source of alternating current having a fixed frequency, a motor or motors whose speed is governed by the frequency of the current supplied thereto, a motor-generator including a motor connected to said source and an alternating current generator connected to said motor or motors, an auxiliary generator for exciting the main generator, a source of direct current for exciting the field of the auxiliary generator, a controller for varying the strength of the exciting current for the auxiliary generator, and a variable speed motor for driving said auxiliary generator at various speeds to cause the excitation of the main generator to be effected by currents of variable frequency.

In witness whereof, I have hereunto set my hand this 19th day of July, 1906.

ALBERT H. ARMSTRONG.

Witnesses:
  BENJAMIN B. HULL,
  HELEN ORFORD.